United States Patent
Vuolle-Apiala

(10) Patent No.: US 6,672,417 B1
(45) Date of Patent: Jan. 6, 2004

(54) ARRANGEMENT IN A SNOWMOBILE EQUIPPED WITH AN APPARATUS FOR INTENSIFYING STEERING

(75) Inventor: Antti Vuolle-Apiala, Jämsänkoski (FI)

(73) Assignee: Destar Oy, Jamsankoski (FI)

( * ) Notice: Subject to any disclaimer, the term of this patent is extended or adjusted under 35 U.S.C. 154(b) by 0 days.

(21) Appl. No.: 09/958,770

(22) PCT Filed: Apr. 14, 2000

(86) PCT No.: PCT/FI00/00315
§ 371 (c)(1),
(2), (4) Date: Jan. 24, 2002

(87) PCT Pub. No.: WO00/61431
PCT Pub. Date: Oct. 19, 2000

(30) Foreign Application Priority Data

Apr. 14, 1999 (FI) .................................................. 990820

(51) Int. Cl.[7] .............................................. B62M 29/00
(52) U.S. Cl. .......................... 180/190; 180/199; 280/28
(58) Field of Search ................. 180/185, 199, 180/190; 280/8, 10, 28

(56) References Cited

U.S. PATENT DOCUMENTS

| 3,568,786 A | * | 3/1971 | Harsch | 180/5 |
| 3,570,616 A | * | 3/1971 | Tominaga | 180/5 |
| 3,623,562 A | * | 11/1971 | Pitra | 180/1 A |
| 3,779,319 A | * | 12/1973 | Pease | 172/45 |
| 3,850,440 A | * | 11/1974 | Reedy | 280/28 |
| 5,109,941 A |   | 5/1992 | Thompson | 180/182 |

FOREIGN PATENT DOCUMENTS

| FI | 102364 | 11/1998 |
| GB | 1152155 | 5/1979 |

OTHER PUBLICATIONS

International Search Report for International Application No. PCT/FI00/00315 filed Apr. 14, 2000.

* cited by examiner

Primary Examiner—Daniel G. DePumpo
(74) Attorney, Agent, or Firm—Alix, Yale & Ristas, LLP

(57) ABSTRACT

An arrangement in a snowmobile equipped with an apparatus for intensifying steering modifies the ski of the snowmobile to include a drum rotated by means of actuators, the drum forming at least part of the bearing surface of the ski. The rotation axis of the drum is oriented such that when the drum rotates, the circumferential surface of the drum moves transversely to the longitudinal axis of the ski. The drum is provided with one or more ridges protruding from its circumferential surface essentially parallel with the rotational axis of the drum. The drum is provided with one or more locking means arranged to lock the drum in a predetermined position when the apparatus for intensifying steering is not being used or to allow the drum to rotate when operation of the apparatus for intensifying steering is desired.

9 Claims, 3 Drawing Sheets

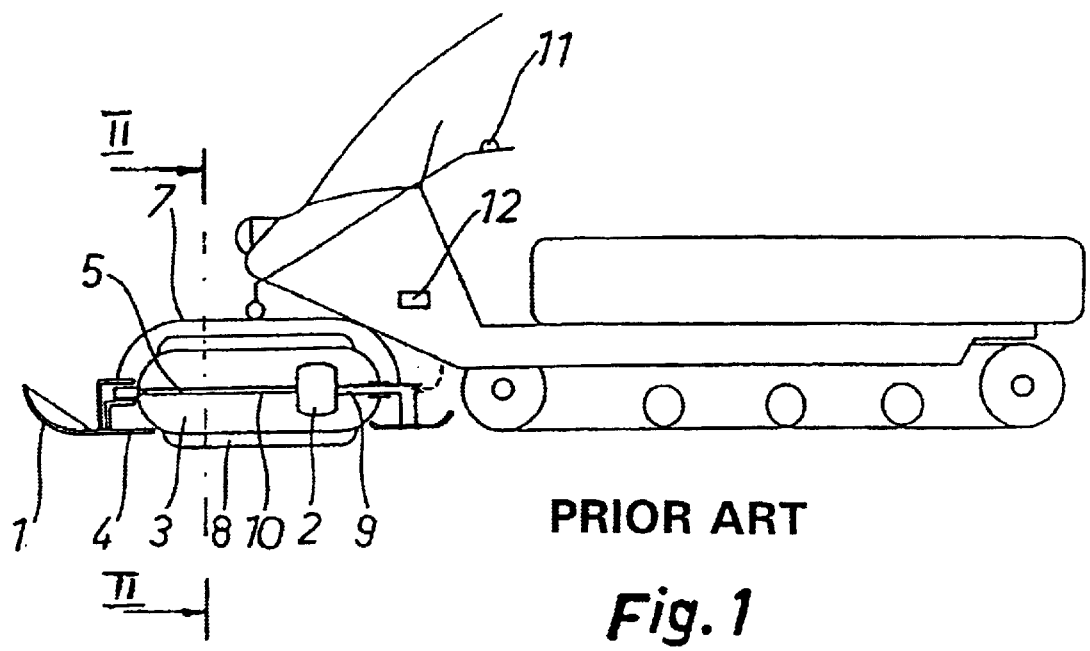
PRIOR ART
Fig. 1
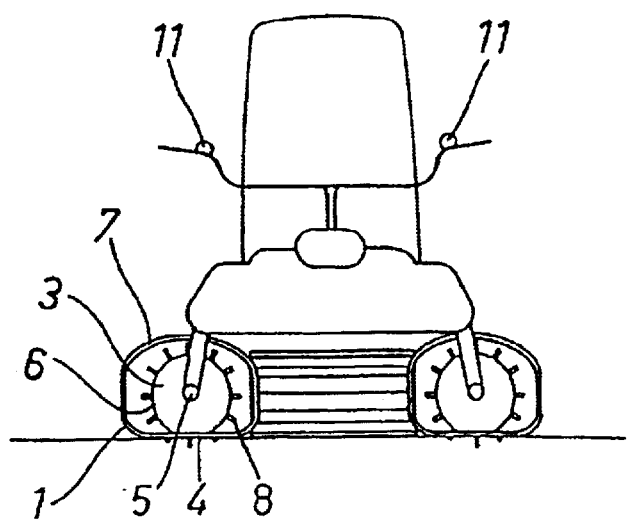
PRIOR ART Fig. 2

ARRANGEMENT IN A SNOWMOBILE EQUIPPED WITH AN APPARATUS FOR INTENSIFYING STEERING

BACKGROUND OF THE INVENTION

1. Field of the Invention

The invention relates to an arrangement in a snowmobile equipped with an apparatus for intensifying steering, which intensifying apparatus consists of the ski of the snowmobile, which comprises a drum rotated by means of actuators, the drum forming at least a part of the bearing surface of the ski, the rotation axis of the drum being fitted with bearings in such a way that when the drum rotates, the circumferential surface of the drum moves transversely with respect to the longitudinal axis of the ski, and which drum is provided with one or more ridges protruding from its circumferential surface, the ridges being essentially parallel with the rotation axis of the drum.

2. Description of the Related Art

The type of snowmobile mentioned above, which is equipped with an apparatus for intensifying steering, is known from the Finnish patent 102364 (Vuolle-Apiala). In this known solution, the starting point was to ensure proper turning capabilities of the snowmobile in all possible conditions. Especially on hard and icy surfaces, the turning capabilities of a snowmobile are known to be very poor and the turning radius usually becomes extremely large. In the known solution, this problem has been eliminated by attaching a rotatable drum to the ski, by means of which drum is effected lateral movement of the ski on hard surfaces. The rotatable drums have eliminated the said problem concerning turning capabilities as such, but at the same time compromises have had to be made as far as normal driving with the snowmobile is concerned. Problems are especially the considerable weight of the drums and, on the other hand, the snowmobile's impaired advancing capacity when driving in the conventional manner, that is, when the intensifying apparatus is not used, because compromises have had to be made in the optimal design of the ski due, on the one hand, to the structure rotating freely during normal operation of the drum and, on the other, to the rotation-symmetrical design of the drum.

SUMMARY OF THE INVENTION

The object of the invention is to eliminate the said defects in the known structure.

This object is achieved by means of the arrangement relating to the invention, of which arrangement it is characteristic that the drum is provided with one or more locking means preventing the rotation of the drum, the locking means being arranged to lock the drum into a predetermined position when the apparatus for intensifying steering is not used and, correspondingly, to allow the drum to rotate when the apparatus for intensifying steering is used.

The solution relating to the invention makes it possible for one of the ridges to extend through the bottom of the ski, corresponding to the conventional bottom iron of the ski, when the drum is locked. The arrangement may also be such that only one ridge is designed and made to be such that it will withstand the strains occurring in normal driving of the snowmobile. In such a case, locking is arranged to take place only when the said ridge is at the desired point. Other ridges can be made structurally weaker and thus lighter. It should, however, be noted in particular that in the arrangement relating to the invention, a fully satisfactory solution may in some cases be achieved by using only one ridge per drum.

Irrespective of the number of ridges, in this case, the normal shape of the bottom of the ski is then very nearly achieved. Another preferred embodiment of the invention comes even closer to the normal shape of the bottom of the ski in which it has been arranged that in at least one locking position of the drum, that part of the drum which forms a part of the bearing surface of the ski is designed to substantially correspond to the shape of the bottom of the ski.

BRIEF DESCRIPTION OF THE DRAWINGS

The invention is described in greater detail in the following with reference to the appended drawings, in which:

FIG. 1 shows a diagrammatic side view of a snowmobile equipped with prior art apparatus for intensifying steering;

FIG. 2 shows a section along line II—II of FIG. 1;

DESCRIPTION OF THE PREFERRED EMBODIMENT

Figure 3:
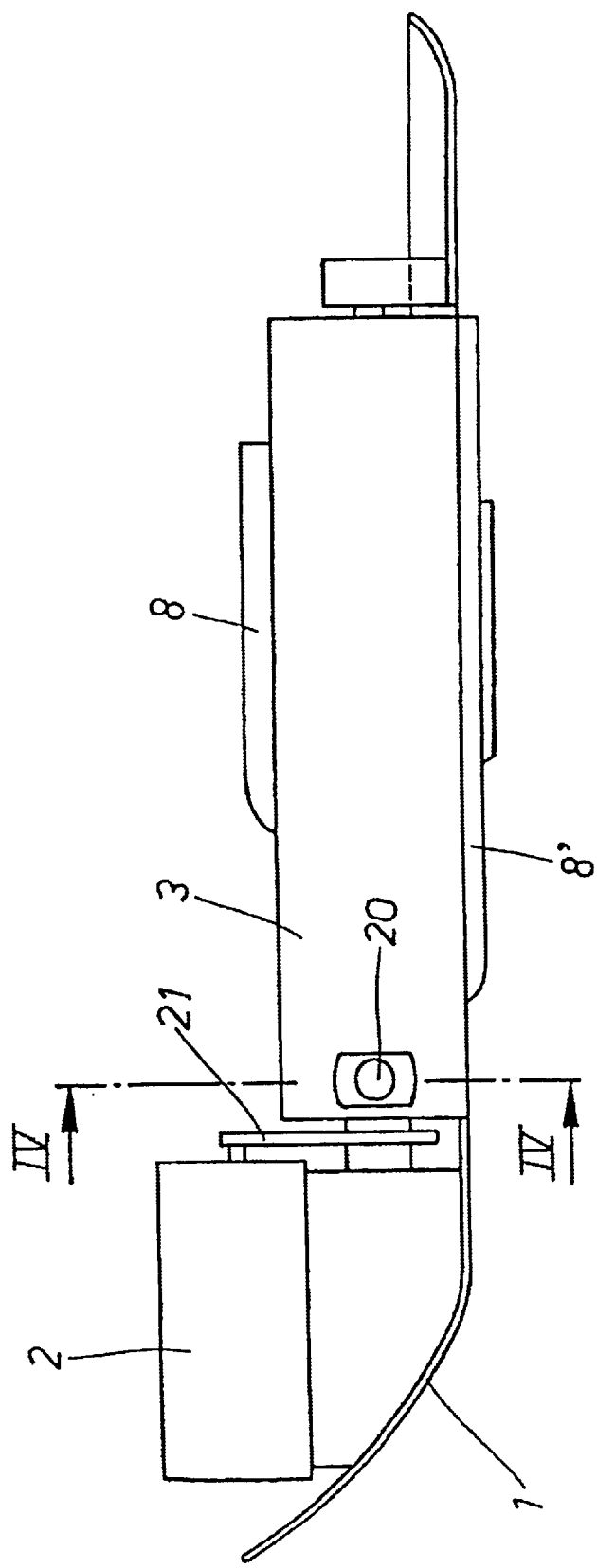
FIG. 3 shows a diagrammatic side view of a ski provided with the arrangement relating to the invention.

FIGS. 1 and 2 illustrate a previously known arrangement for intensifying the steering of a snowmobile. Both skis of the snowmobile shown diagrammatically in FIGS. 1 and 2 are provided with a drum 3 known from the prior art which is rotatable by means of an actuator 2, most conveniently by means of an electric motor 2.

The drum 3 forms at least a part of the bearing surface 4 of the ski 1. The rotation axis 5 of the drum 3 is fitted with bearings in such a way that when the drum 3 rotates, the circumferential surface 6 of the drum moves transversely with respect to the longitudinal axis of the ski 1. The drum 3 is fitted with bearings to the ski 1 or a supporting structure 7 of the ski.

The drum 3 is provided with ridges 8 protruding from its circumferential surface 6, which ridges are essentially parallel with the rotation axis 5 of the drum 3. In each position of the drum 3, at least one ridge 8 extends at least partly through the bottom 4 of the ski 1.

The actuator of the drum 3 consists of an electric motor 2 arranged inside the drum 3. The electric motor 2 is fixed to the end of a shaft 9 which is concentric with the rotation axis 5 of the drum 3 and arranged non-rotatably with respect to the ski 1. The motor 2 rotates shaft 10 by means of a gear reducer, the said shaft in turn rotating the drum 3. At its rear end, the drum 3 is fitted with bearings on shaft 9 and at its front end on shaft 10 extending from the drum 3 to the supporting structure 7 of the ski 1. In FIGS. 1 and 2, the main part of the supporting structure 7 is formed by the casing surrounding the drum 3 from above.

The snowmobile is normally steered by turning the handlebar but if it is desirable to turn the snowmobile quickly on a hard base, for example on an icy surface, one of two switches 11 is pressed, whereby the drums 3 begin to rotate in the direction in question. Similarly, when the other switch 11 is pressed, the drums 3 will rotate in the opposite direction.

Figure 4:
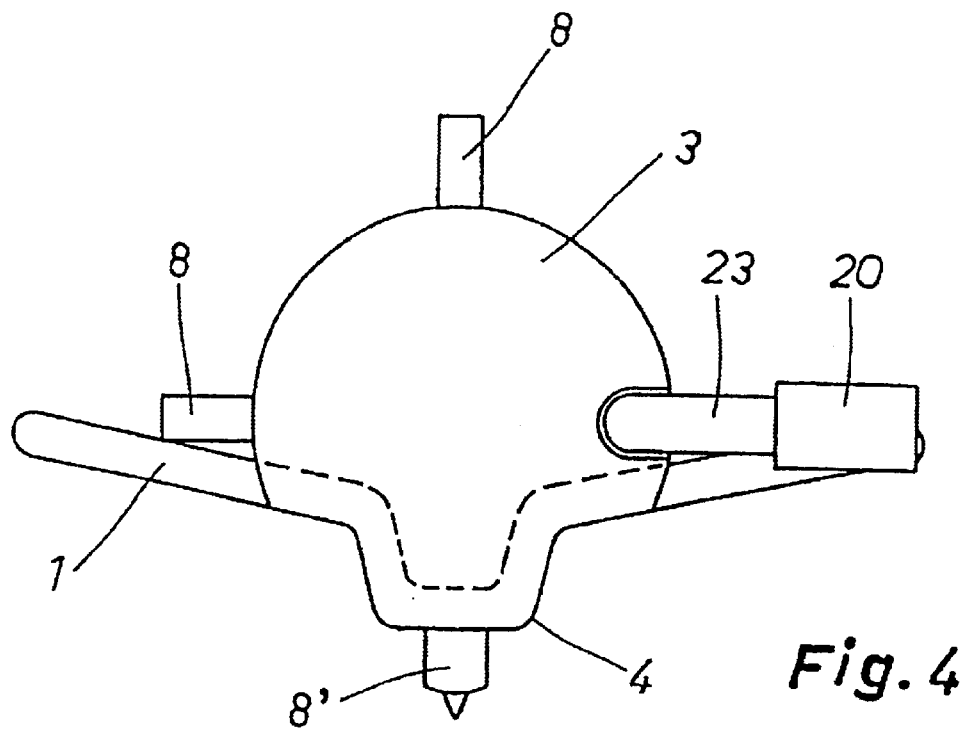
FIG. 4 shows a section along line IV—IV of FIG. 3.
Figure 5:
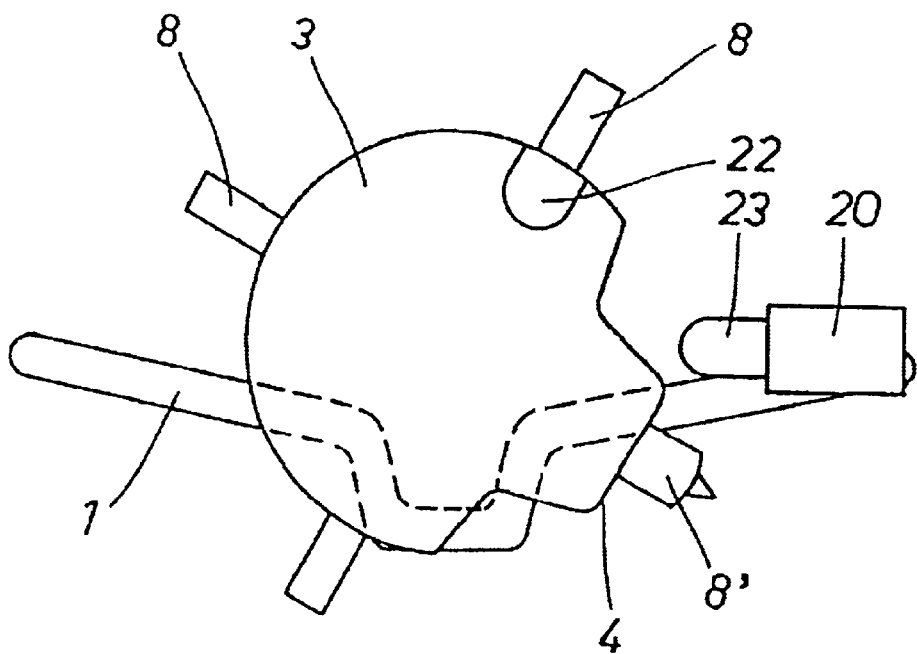
FIG. 5 shows a section according to FIG. 4 when the drum is in the unlocked position.

FIGS. 3 to 5 illustrate an exemplary preferred embodiment of an apparatus for intensifying steering in accordance with the present invention and use the same reference numerals as FIGS. 1 and 2 to identify corresponding parts.

The drum 3 shown in FIGS. 3 to 5 may be fitted with bearings in the manner disclosed in connection with FIGS. 1 and 2. In the example shown in FIGS. 3 to 5, the actuator 2 rotating the drum 3, for example, via a chain 21 is arranged outside the drum 3, but the actuator 2 may obviously also be inside the drum 3. The actuator 2 is preferably comprised of a battery-driven screwdriver or the like.

One particularly significant aspect of the arrangement in accordance with the present invention is that the drum 3 is provided with a locking member 20 which prevents the rotation of the drum 3.

The locking member is arranged to lock the drum 3 into a predetermined position when the apparatus for intensifying steering is not used and, correspondingly, to allow the rotation of the drum 3 when the apparatus for intensifying steering is used.

In practice, as a locking member 20 may be, for example, a locking solenoid, which is solidly fitted to the ski 1. On the circumference of the drum 3 is arranged a recess or groove 22 for the locking solenoid 20 at such a point that when the drum is in a predetermined position, the locking pin 23 of the locking solenoid 20 can penetrate into the recess or groove 22 and prevent the drum 3 from rotating. There may be one or more locking points.

The operation of the locking solenoid 20 is preferably arranged in such a way that when the apparatus for intensifying steering is used, the locking solenoid 20 pulls the locking pin 23 out of the recess or groove 22. Correspondingly, when the apparatus for intensifying steering is not used, the locking solenoid 20 releases the locking pin 23, whereby, due to the effect of a spring (not shown) inside the locking solenoid 20, the said pin is pushed against the outer circumference of the drum 3. Since the drum 3 is able to move freely during driving, the drum is rotated after a very short driving distance into such a position that the locking pin 23 penetrates into the recess or groove 22 and thus prevents the drum from rotating until the apparatus for intensifying steering is again used.

The drum 3 and the ridges 8, 8' on it are dimensioned in such a way that when the drum 3 rotates, the ridges 8, 8' extend in turn through an opening made for the drum 3 on the bottom of the ski 1.

The locking position or locking positions of the drum 3 must be selected in such a way that one of the ridges 8, 8' is placed into a position corresponding to the conventional bottom iron of the ski 1 when the drum is locked. Since, however, extremely strong forces and strains are exerted on the bottom iron of the ski, it is advantageous to construct only one ridge 8' to meet the requirements set on the bottom iron and to arrange for locking to take place only when the said ridge 8' is at the desired point. This means that the other ridges can be made of a substantially weaker material, thus making the drum as a whole essentially lighter.

Performance of a snowmobile ski equipped with an apparatus for intensifying steering in accordance with the present invention is greatly improved over that of the prior art by locking the drum 3 in such a way that one of the ridges 8, 8' is in a position corresponding to the conventional bottom iron. It is, however, most preferable that, in at least one locking position of the drum, that part of the drum which forms a part of the bearing surface 4 of the ski 1 is designed to correspond substantially to the shape of the ski bottom (see FIGS. 4 and 5). This solution results in the drum 3 having little or no practical effect on the normal operation of the ski 1.

The invention is described above with reference to only one of its preferred exemplifying embodiments. It should, however, be noted that the invention can be modified in various ways which means that, for example, the drum 3 as a whole can be designed in such a way that it will form a ski 1 already as such.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An arrangement in a snowmobile equipped with an apparatus for intensifying steering comprising the ski of the snowmobile and a drum rotated by means of actuators, the drum forming at least a part of the bearing surface of the ski, the rotation axis of the drum being fitted with bearings in such a way that when the drum rotates, the circumferential surface of the drum moves transversely with respect to the longitudinal axis of the ski, and which drum is provided with one or more ridges protruding from its circumferential surface, the ridges being essentially parallel with the rotation axis of the drum, characterized in that the drum is provided with one or more locking means for preventing the rotation of the drum, the locking means being arranged to lock the drum into a predetermined position when the apparatus for intensifying steering is not used and, correspondingly, to allow the drum to rotate when the apparatus for intensifying steering is used.

2. An arrangement as claimed in claim 1, characterized in that in at least one locking position of the drum, a ridge is arranged to extend at least partly through an opening made for the drum on the bottom of the ski.

3. An arrangement as claimed in claim 1, characterized in that in at least one locking position of the drum, that part of the drum which forms a part of the bearing surface of the ski is designed to substantially correspond to the shape of the bottom of the ski.

4. An arrangement as claimed in claim 2, characterized in that in a least one locking position of the drum, that part of the drum which forms a part of the bearing surface of the ski is designed to substantially correspond to the shape of the bottom of the ski.

5. An apparatus for intensifying the steering of a snowmobile comprising:

a ski having a longitudinal axis, a shaped bearing surface and defining an opening;

a drum mounted to said ski for rotation about an axis of rotation parallel to said longitudinal axis, said drum having at least one ridge protruding from a circumferential surface of said drum, said at least one ridge being generally parallel to said rotational axis and said drum mounted such that a portion of said circumferential surface forms at least part of said bearing surface of said ski;

drum actuation means for rotating said drum relative to said ski; and locking means for locking said drum in a predetermined position.

6. The apparatus of claim 5, wherein the portion of said circumferential surface which forms at least part of said bearing surface when said drum is in said predetermined position is configured to correspond substantially to the shape of said bearing surface.

7. The apparatus of claim 5, wherein said at least one ridge comprises a plurality of ridges.

8. The apparatus of claim 8, wherein one of said ridges is constructed to withstand forces exerted on the bearing surface during use of the snowmobile and said one of said ridges projects through said opening substantially along the longitudinal axis of said ski when said drum is locked in said predetermined position.

9. The apparatus of claim 6, wherein said drum comprises a recess and said locking means comprises a solenoid solidly fitted to the ski, said solenoid comprising a locking pin arranged to selectively penetrate said recess to prevent said drum from rotating.

* * * * *

UNITED STATES PATENT AND TRADEMARK OFFICE
CERTIFICATE OF CORRECTION

PATENT NO. : 6,672,417 B1
DATED : January 6, 2004
INVENTOR(S) : Vuolle-Apiala

It is certified that error appears in the above-identified patent and that said Letters Patent is hereby corrected as shown below:

Column 5,
Line 1, delete "claim 8" and insert therefor -- claim 7 --.
Line 7, delete "claim 6" and insert therefor -- claim 5 --.

Signed and Sealed this

Third Day of May, 2005

JON W. DUDAS
*Director of the United States Patent and Trademark Office*